United States Patent [19]

Lusetti et al.

[11] Patent Number: 4,658,677
[45] Date of Patent: Apr. 21, 1987

[54] DEVICE FOR GRINDING CHAIN SAW TEETH

[75] Inventors: Giorgio Lusetti; Lorenzo Secchi, both of Reggio Emilia, Italy

[73] Assignee: Precision Tooling s.r.l., Reggio Emilia, Italy

[21] Appl. No.: 753,038

[22] Filed: Jul. 9, 1985

[30] Foreign Application Priority Data

Jul. 12, 1984 [IT] Italy ................................ 3524 A/84

[51] Int. Cl.⁴ ............................................ B23D 63/16
[52] U.S. Cl. ................................................ 76/25 A
[58] Field of Search ........................... 76/25 A, 37, 40

[56] References Cited

U.S. PATENT DOCUMENTS 2,792,724  5/1957  Durall ................................ 76/25 A
4,319,502  3/1982  Smith ................................. 76/25 A
4,463,630  8/1984  Turner ............................... 76/25 A

FOREIGN PATENT DOCUMENTS 2260990  6/1973  Fed. Rep. of Germany ..... 76/25 A

Primary Examiner—Roscoe V. Parker
Attorney, Agent, or Firm—Stevens, Davis, Miller & Mosher

[57] ABSTRACT

A device includes a supporting structure for a casing which houses an electric motor whose shaft is splined on the axis of rotation of a disk grinding wheel. The device is characterized in that the structure is fixed on a saw blade of a chain saw, with the casing functioning to bring the grinding wheel in contact with the chain teeth. A stop is provided to prevent translation of each tooth under the action of the disk grinding wheel.

7 Claims, 14 Drawing Figures

U.S. Patent  Apr. 21, 1987  Sheet 3 of 3  4,658,677
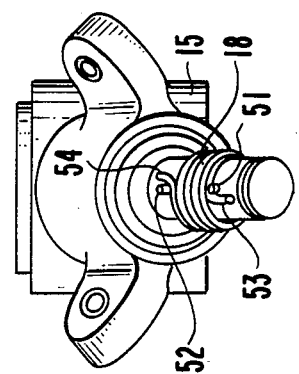
Fig.11
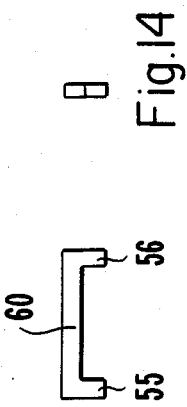
Fig.14
Fig.13
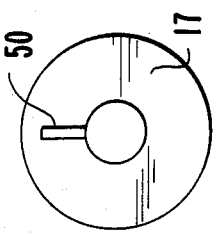
Fig.12
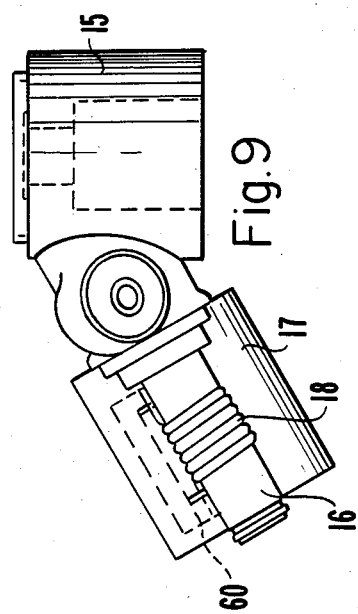
Fig.9
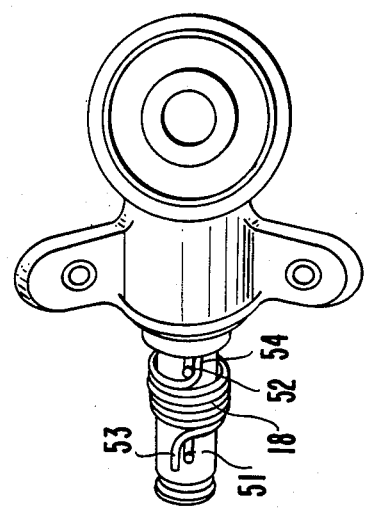
Fig.10

DEVICE FOR GRINDING CHAIN SAW TEETH

The invention relates to a device for grinding, according to suitable angles and depths, the teeth of a chain saw, which, as known, are disposed in sequence on a chain which winds a bearing saw blade, thus allowing the rotation of the chain which is driven by an internal combustion engine.

In chain saws, the teeth cut wooden materials by removing shavings with defined thiknesses; for proper functioning of the chain saw it is necessary that all the teeth be well ground according to predetermined angles and depths; with use, the grinding runs low so that it must be reset to avoid improper functioning of the chain saw and a further damaging of the teeth, thus consuming a considerable quantity of energy.

To reset the grinding of the teeth, grinders are used which are mounted on a workbench. As a result, they are heavy and bulky; they operate on a chain removed from the chain saw and have the disadvantage of not being portable.

Portable devices are also known, e.g., saw files or candle grinding wheels which grind the teeth. The first such devices are used in an empirical manner so the operator must be very expert and the operation requires much time. The second such devices are subjected to wear because of their particular geometry, therefore, each grinding wheel can be used only for a small number of chains.

The invention as claimed is intended to remedy these drawbacks. It solves the problem of how to create a device for grinding chain saw teeth or similar cutting machines. By using such a device the following advantages are achieved: the grinding of the teeth is made by a disk grinding wheel, whose average life is longer than that of candle grinding wheels; the angle and depth precision is guaranteed for a long working lifetime for numerous series of chains.

The advantages offered by the invention are mainly that the use of a disk grinding wheel allows, in addition to the above-described uniformity in work during time, a very easy use; such a device is portable, applicable to the chain of a chain saw; without removal of the chain. It can be used whereever an energy source is present for a motor which rotates the grinding wheel. The device is extremely durable.

One way of implementing the invention is described in detail below with reference to the accompanying drawings which illustrate only one specific embodiment, in which:

FIG. 9 illustrates additional features of the device according to the present invention;

FIG. 10 is a top view of the element of FIG. 4;

FIG. 11 is another view of the FIG. 9 elements;

FIG. 12 is a sectional view of bushing 17 showing milling 50;

FIG. 13 is a view of U-shaped member 60; and

FIG. 14 is an end view of U-shaped member 60.

Figure 6:
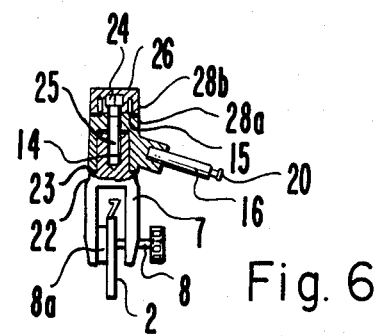
Figure 7:
Figure 8:
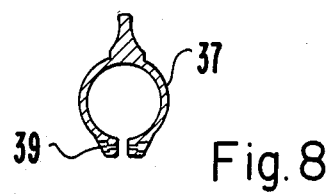

The figures show a device for grinding chain saw teeth comprising a structure 1 suitable to be fixed on a saw blade 2 of a chain saw 3; structure 1 comprises a supporting element for a casing 4 able to house an electric motor with a shaft splined on an axis of rotation of a disk grinding wheel 5 suitable to make contact with a tooth 6 of a chain of chain saw 3 to reset the correct cutting angle. The structure 1 is suitable to be disposed astride saw blade 2, comprising, as is apparent from FIG. 6, a jaw 7 fitted with an engaging screw 8 for saw blade 2. Screw 8 permits structure 1 to remain fixed relative to the saw blade 2 cooperating with abutment structures 8a.

The structure 1 supports a first and second flexible sheet elastic clamp 9a and 9b, fitted with, respectively, a first and a second adjusting screw (one of which is represented by reference numeral 10b in FIG. 4 and the other of which is comparable to screw 10b and has thus not been shown) for adjusting the elastic preload of clamps 9a and 9b to constrain the tooth 6 relative to the structure 1 to avoid the consequences of the traverse stresses developed by the grinding wheel 5.

Third and fourth positioning screws 9c and 9d define the position of the sheets 9a and 9b relative to structure 1.

A metallic sheet bar 12 defines, in a rightward direction, the position of each tooth 6; bar 12 has a first bent left end 12a to avoid rightward translation of the tooth 6 and to favour the positioning of a subsequent tooth, which, by sliding, allows the rising of end 12a.

On a second end 12b, bar 12 is fitted with a slot against which engages a fixing and adjusting screw 13 for adjusting the position of said bar 12.

Structural 1 supports a pin 14 (FIG. 6) which permits rotation of a bushing 15 which is integral with a pin 16 suitable to be inserted in a bushing 17 inside of which a torsion spring 18 is arranged to oppose the relative rotation of the bushing 17 with respect to the pin 16. An elastic ring is inserted in a groove 20 of pin 16 to prevent translation of the pin inside of the bushing 17.

At the base of pin 14, on structure 1, there is an annular surface 21 which has a splined zone 22 with radial splines relative to the centre of said surface 21; the splines of the zone 22 cooperate with similar splines made in a front surface 23 of said bushing 15 to prevent unnecessary rotation when using the device and to arrange at a suitable angle the bushing 17 relative to pin 14.

In order to prevent, during use, the rotation of the bushing 15 relative to pin 14, a fixing screw 24 is inserted in an axial hole 25 made in pin 14.

Screw 24 supports a knob 26 with a knurled side surface 27 which, when tightened, gives to bushing 15 a force necessary and sufficient to prevent rotation between the aforesaid splines.

The thrust of the screw 24 is applied to bushing 15 by the pressure contact of two surfaces 28a and 28b, respectively, belonging to bushing 15 and knob 26.

For a visual positioning of bushing 15 relative to pin 14, the structure 1 has a reference graduated zone 29 and the bushing 15 has a vertical nick 30 allowing the angular positioning of bushing 15 relative to pin 14 to obtain a subsequent correct functioning of the device.

The casing 4 is rotated around pin 16 via a handle 31 situated as a protuberance of casing 4 in its upper part against the action of a return spring 18.

Figure 4:
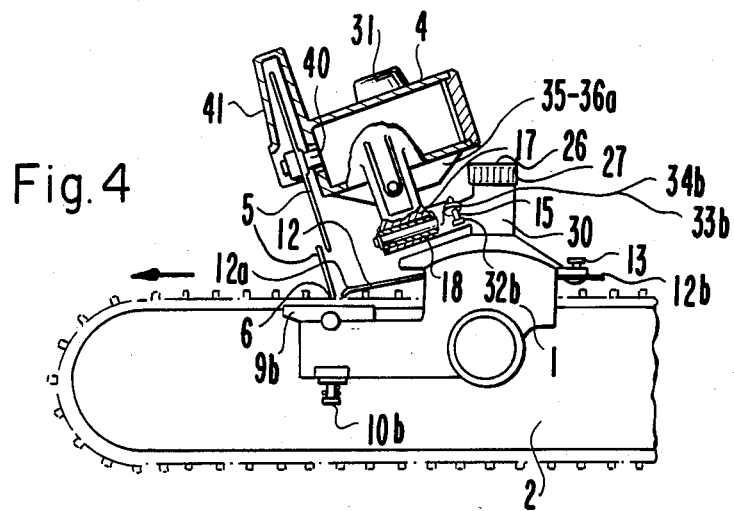
FIG. 4 represents the same device where a grinding wheel is shown in a first steady position and in a second working position.
Figure 5:
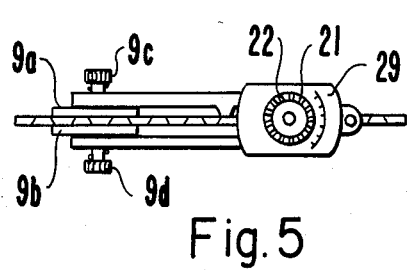
FIGS. 5-8 represent detailed views of particular elements of the device in accordance with the invention.

To limit angular movement, both rightward and leftward, of casing 4 relative to pin 16, two limit stop screws (one of which is illustrated by reference numeral 32b in FIG. 4 and the other of which is comparable to screw 32b and thus has not been shown in the drawings), respectively, right and left, are inserted in respective holes (one of which is illustrated by reference numeral 33b in FIG. 4, and the other of which is comparable to hole 33b and thus has not been shown in the drawings made in, respectively, two lugs (one of which is illustrated by reference numeral 34b in FIG. 4 and the other of which is comparable to lug 34b and thus is not shown) of the structure 1 for engaging casing 4. The ends of the two limit stop screws screws cooperate with a rib 35 disposed on a symmetry plane in casing 4 and suitable to abut with a face (not shown) on the limit stop screw to define the maximum leftward angular excursion of casing 4 and with a face (not shown) on screw 32b to define the maximum rightward angular excursion of casing 4.

The casing 4 houses an electric motor, not shown, which is correctly and steadily positioned inside said casing 4 by known means, not shown, and by an elastic ring 37 made in the body of said casing 4 and suitable to be closed by a closing screw 38 housed in a hole 39.

The aforesaid electric motor has a shaft 40 on which the disk grinding wheel 5 is splined, according to a known method and means not shown; disk grinding wheel 5 is sheltered, in its upper part, by a sump 41 to prevent harm from sparks to the operator.

The functioning of the device can be explained as follows: it is known that chains have alternating right and left teeth 6, respectively, therefore the grinding is made, for example, first on the left teeth then on the right ones.

Only the operation relative to the left teeth will be explained herein because a simple and opportune rotation of bushing 15, referred to the graduated zone 29, allows the subsequent grinding operation on the right teeth.

The first operation is to fit of the device on the saw blade 2; this operation does not require the removal of the chain from the chain saw 3. To accomplish this, it is necessary to opportunely position the device so that the clamps 9a and 9b are in a position such that they cover the chain to elastically engage it under the action of the two adjusting screws (only screw 10b is shown). The structural element allowing the steady positioning of structure 1 relative to the saw blade 2 is the screw 8.

Figure 1:
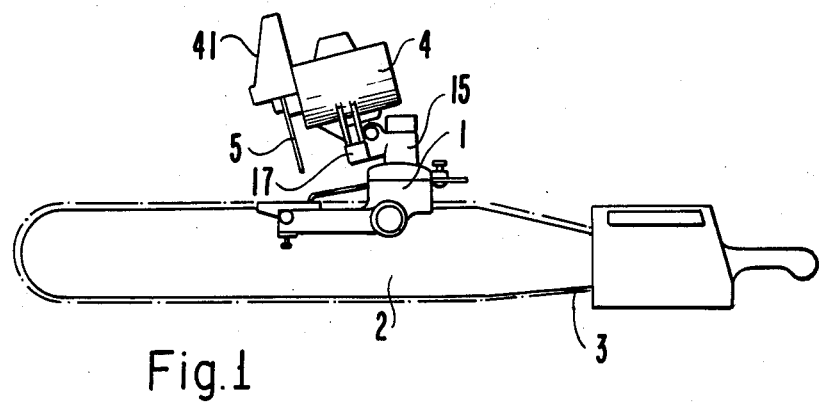
FIG. 1 represents a side view of a device in accordance with the invention, disposed on a mounted chain saw.
Figure 2:
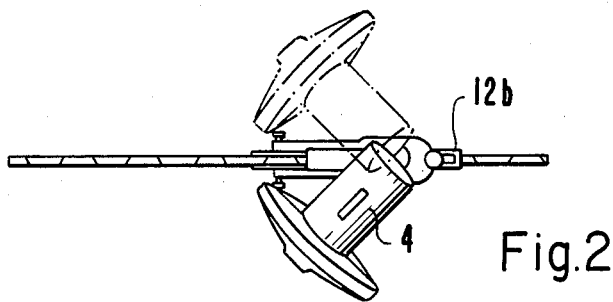
FIGS. 2-3 represent a top view of the device.
Figure 3:
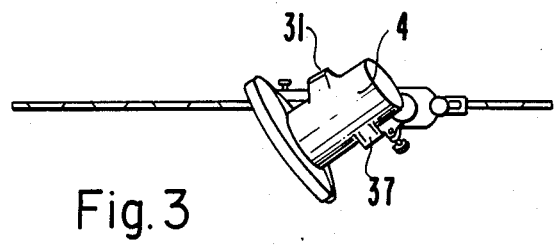

Once the shorter tooth, among those present, has been choosen, the bar 12 is disposed, after having manoeuvered on screw 13, such that the end 12a of the same bar defines the working position for each tooth. At this point the motor is on and, in consequence, the grinding wheel 5 is also running; with a manual thrust on the handle 31 the casing 4 is pushed downward such that the grinding wheel 5 is disposed in the position shown in FIG. 3, that is, in contact with the cutting contour of the teeth.

Once the operation on a tooth has been completed, the chain is dragged toward the arrow direction such that the bar 12 allows, for elasticity, the passing of the same tooth; then the second subsequent tooth, which also is a left tooth, is positioned and the above operation is repeated.

The invention can be subjected to modifications not affecting its essence. Particularly, the structure 1 can be constituted by an essentially closed tubular shaped bearing zone able to wholly house said saw blade 2 and fitted with the previously mentioned engaging means for the same saw blade. Furthermore, as illustrated in FIGS. 9–14 the bushing 17 can be fitted with a milling input 50, parallel to its own axis of symmetry, to provide a precision housing for a U-shaped structure 60 whose bent ends 55 and 56 are turned toward said pin 16; two gudgeon pins 51 and 52 are fixed to engage the bent ends 53 and 54 of the spring 18. These two gudgeon pins 51 and 52 delimit the position of structure 1.

During use, when the bushing 17 is rotated clockwise, an end of said U-shaped structure drags the end of said spring 18 on which it is engaged thus allowing the other end of the spring to remain fixed to the opposite pin as a result counteracting forces against the spring 18 are obtained, which are symmetrical in the two rotation directions.

We claim:

1. A device for grinding the teeth of a chain saw, comprising:
    a casing for housing an electric motor which includes a pivotable splined shaft;
    a disk grinding wheel, said shaft of said motor being splined to said grinding wheel at an axis of rotation thereof;
    a support structure supporting said casing, said support structure including a first pin, said support structure being adapted to straddle a bar of said chain saw, said support structure comprising first stopping means for stopping movement of said teeth of said chain saw;
    a first bushing rotatably mounted on said first pin to define a rotation direction of said first bushing;
    a second pin fixed to said first bushing;
    a second bushing rotatably mounted on said second pin to define a rotation direction of said second bushing, said second bushing being integral with said casing;
    an elastic means comprising a torsion spring disposed inside said second bushing, said casing comprising a manually-movable handle biased by said elastic means; and
    second and third stopping means for defining stop positions of said casing.

2. A device as in claim 1, wherein said support structure further comprises a substantially closed tubular bearing zone, said bearing zone comprising an engaging means for engaging with said bar of said chain saw, and said first stopping means comprises first and second elastic clamps for constraining movement of said teeth during a grinding operation.

3. A device as in claim 1, wherein said casing is supported by said support structure by means of said first pin, and further comprising a screw fixing means for positioning said first pin in a predetermined position.

4. A device as in claim 1, wherein said second pin comprises first and second gudgeon pins and said spring comprises first and second ends engaged with said first and second gudgeon pins, said device further comprising a U-shaped structure housed in a milling portion in said second bushing, said U-shaped structure comprising first and second ends for making dragging contact with said first and second ends of said spring.

5. A device as in claim 3, wherein said screw fixing means is disposed in an axial hole in said first pin.

6. A device as in claim 5, further comprising a knob having a knurled surface, said knob being supported on said screw fixing means.

7. A device as in claim 6, wherein said first pin includes an annular surface with radially extending splines at its base, and said first bushing includes a front surface including a plurality of splines for engagement with said radially extending splines to prevent unnecessary rotations and to properly position said second bushing relative to said first pin.

* * * * *